(12) United States Patent
Kang et al.

(10) Patent No.: US 11,294,212 B2
(45) Date of Patent: Apr. 5, 2022

(54) DISPLAY DEVICE HAVING REDUCED BEZEL SIZE

(71) Applicant: SAMSUNG ELECTRONICS CO., LTD., Suwon-si (KR)

(72) Inventors: Jonghyun Kang, Suwon-si (KR); Dongwoon Kim, Suwon-si (KR); Beomhan Kim, Suwon-si (KR); Byoungjung Kim, Suwon-si (KR); Junpil Oh, Suwon-si (KR); Dongyool Lee, Suwon-si (KR); Seojoon Lee, Suwon-si (KR); Kyo Jeong, Suwon-si (KR); Junsu Jung, Suwon-si (KR); Hyunjoong Chae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/078,766

(22) Filed: Oct. 23, 2020

(65) Prior Publication Data

US 2021/0124209 A1 Apr. 29, 2021

(30) Foreign Application Priority Data

Oct. 25, 2019 (KR) .................. 10-2019-0134021

(51) Int. Cl.
*G02F 1/1333* (2006.01)
*G02F 1/1335* (2006.01)
*G02F 1/13357* (2006.01)

(52) U.S. Cl.
CPC .. *G02F 1/133308* (2013.01); *G02F 1/133605* (2013.01); *G02F 1/133606* (2013.01);
(Continued)

(58) Field of Classification Search
None
See application file for complete search history.

(56) References Cited

U.S. PATENT DOCUMENTS

2012/0050636 A1 3/2012 Jeong et al.
2013/0293804 A1* 11/2013 Kim ................ B29C 65/542
349/58
(Continued)

FOREIGN PATENT DOCUMENTS

JP 2005-130321 A 5/2005
JP 2005-250269 A 9/2005
(Continued)

OTHER PUBLICATIONS

International Search Report dated Feb. 17, 2021, issued by the International Searching Authority in International Application No. PCT/KR2020/014100 (PCT/ISA/210).

*Primary Examiner* — Phu Vu
(74) *Attorney, Agent, or Firm* — Sughrue Mion, PLLC

(57) ABSTRACT

A display device including a rear chassis; a light source module installed on the rear chassis, the light source module being configured to emit light; a diffuser plate provided in front of the light source module, the diffuser plate being configured to diffuse the light emitted by the light source module; a liquid crystal panel provided in front of the diffuser plate, the liquid crystal panel being configured to display an image; a front chassis covering a side surface of the liquid crystal panel and a side surface of the diffuser plate; a middle mold provided between the front chassis and the rear chassis, the middle mold being coupled to the rear chassis and the diffuser plate; and a first adhesive provided between the diffuser plate and the middle mold, the first adhesive bonding the diffuser plate being to the middle mold.

14 Claims, 11 Drawing Sheets

(52) U.S. Cl.
CPC .... *G02F 1/133611* (2013.01); *G02F 1/13332* (2021.01); *G02F 1/133317* (2021.01); *G02F 1/133607* (2021.01); *G02F 2202/28* (2013.01)

(56) References Cited

U.S. PATENT DOCUMENTS

| | | |
|---|---|---|
| 2015/0301392 A1 | 10/2015 | Shi et al. |
| 2017/0038027 A1* | 2/2017 | Park ..................... G02B 6/0061 |
| 2017/0083273 A1 | 3/2017 | Kim et al. |
| 2017/0123274 A1* | 5/2017 | Jeong ................ G02F 1/133606 |
| 2017/0309689 A1* | 10/2017 | Li ....................... H01L 27/3244 |
| 2019/0137829 A1* | 5/2019 | Kim .................. G02F 1/133605 |
| 2019/0243412 A1* | 8/2019 | Siddiqui ............. H04M 1/0266 |
| 2020/0285097 A1* | 9/2020 | Zhang .................. G02B 6/0088 |
| 2020/0310198 A1* | 10/2020 | Li ....................... G02F 1/133608 |

FOREIGN PATENT DOCUMENTS

| | | |
|---|---|---|
| JP | 2014-98726 A | 5/2014 |
| KR | 10-2003-0004246 A | 1/2003 |
| KR | 10-0660608 B1 | 12/2006 |
| KR | 10-0752632 B1 | 8/2007 |
| KR | 10-2011-0023454 A | 3/2011 |
| KR | 10-1432899 B1 | 8/2014 |
| KR | 10-2014-0145851 A | 12/2014 |
| KR | 10-1541352 B1 | 8/2015 |
| KR | 10-1891566 B1 | 8/2018 |
| KR | 10-1955990 B1 | 6/2019 |
| WO | 2014/083692 A1 | 6/2014 |

\* cited by examiner

DISPLAY DEVICE HAVING REDUCED BEZEL SIZE

CROSS-REFERENCE TO RELATED APPLICATION

This application is based on and claims priority under 35 U.S.C. § 119 to Korean Patent Application No. 10-2019-0134021 filed on Oct. 25, 2019, in the Korean Intellectual Property Office, the disclosure of which is incorporated by reference herein in its entirety.

BACKGROUND

1. Field

The disclosure relates to a display device, and more particularly, to a display device with a reduced bezel size to enhance the aesthetic impression.

2. Description of Related Art

A display device is an output device for visually presenting data information and images, such as text or figures. Types of display devices include a television, various kinds of monitors, many different kinds of portable terminals (e.g., notebooks, tablet personal computers (PCs), and smart phones), etc.

A display device may include a display panel for presenting a screen and a bezel provided on edges of the display panel.

Recently, display devices with a slim bezel or no bezel are being developed to enhance the aesthetic appearance.

SUMMARY OF THE INVENTION

Provided is a display device with a reduced bezel size.

Also provided is a display device with reduced thickness from front to back to enhance the aesthetics of the display.

Additional aspects will be set forth in part in the description which follows and, in part, will be apparent from the description, or may be learned by practice of the presented embodiments.

According to an aspect of the disclosure, a display device includes a rear chassis; a light source module installed on the rear chassis, the light source module being configured to emit light; a diffuser plate provided in front of the light source module, the diffuser plate being configured to diffuse the light emitted by the light source module; a liquid crystal panel provided in front of the diffuser plate, the liquid crystal panel being configured to display an image; a front chassis covering a side surface of the liquid crystal panel and a side surface of the diffuser plate; a middle mold provided between the front chassis and the rear chassis, the middle mold being coupled to the rear chassis and the diffuser plate; and a first adhesive provided between the diffuser plate and the middle mold, the first adhesive bonding the diffuser plate to the middle mold.

An outermost surface of the middle mold may be coplanar with the side surface of the liquid crystal panel, or may be located within a perimeter defined by the side surface of the liquid crystal panel.

The front chassis may include an inner side surface facing the side surface of the liquid crystal panel, the side surface of the diffuser plate, and a side surface of the middle mold. The front chassis may further include an outer side surface opposite to the inner side surface, and the inner side surface may extend parallel to the outer side surface.

A second adhesive may be provided between the middle mold and the liquid crystal panel, the second adhesive bonding the middle mold to the liquid crystal panel.

The middle mold may include a first adhesion surface on which the first adhesive is disposed, and a supporting projection protruding further toward the liquid crystal panel than the first adhesion surface and including a second adhesion surface on which the second adhesive is disposed.

The second adhesive may include and ultraviolet (UV) resin applied in a liquid state and hardened by a UV ray.

The side surface of the diffuser plate may be located within a perimeter defined by the side surface of the liquid crystal panel, and the supporting projection may be provided next to the side surface of the diffuser plate and the supporting projection is bonded directly to the liquid crystal panel by the second adhesive.

The supporting projection may include a light reflecting surface within a recess provided in a side of the supporting projection facing the side surface of the diffuser plate, and wherein the light reflecting surface is configured to reflect the light emitted from the light source module towards a back of the display device.

The first adhesive includes a transparent substance with 90% or more of light transmittance so that light is transmitted between the diffuser plate and the middle mold through the first adhesive.

The middle mold may further include a light guide surface providing a path for light emitted from the light source module to pass through the first adhesive and enter into the diffuser plate, and the light guide surface may inclined backwards from an adhesion surface of the middle mold on which the first adhesive is disposed.

A third adhesive may bond the side surface of the diffuser plate to the middle mold, and a rear surface of the diffuser plate may be bonded to the first adhesion surface by the first adhesive.

The liquid crystal panel may be bonded to the diffuser plate by the second adhesive, and the diffuser plate may be bonded to the middle mold by the first adhesive.

The light source module may include a plurality of light sources configured to emit light toward the diffuser plate, a substrate on which the plurality of light sources are mounted, the light sources facing the diffuser plate, and a reflecting sheet provided on the substrate, the reflecting sheet being configured to reflect light emitted from the plurality of light sources and light reflected from the diffuser plate back toward the diffuser plate.

The light source module may further include a plurality of lenses mounted on the substrate and individually covering the plurality of light sources, the plurality of lenses may be configured to diffuse light emitted from the plurality of light sources.

A chassis adhesive may bond the front chassis to a side surface of the middle mold.

According to another aspect of the disclosure, a display device includes a rear chassis; a light source module provided on the rear chassis, the light source module being configured to emit light; a liquid crystal panel provided in front of the light source module, the liquid crystal panel comprising a front surface configured to display an image; a front chassis covering a side surface of the liquid crystal panel; and a middle mold coupled to the rear chassis for supporting the liquid crystal panel, the middle mold having an outermost surface positioned coplanar with the side surface of the liquid crystal panel or positioned within a perimeter defined by the side surface of the liquid crystal panel.

A diffuser plate may be provided in front of the light source module, the diffuser plate being configured to diffuse the light emitted from the light source module; and a first adhesive may be provided between the diffuser plate and the middle mold. The first adhesive bonding diffuser plate to the middle mold.

The middle mold may include a supporting projection provided next to a side surface of the diffuser plate, and the supporting projection may be bonded directly to the liquid crystal panel by a second adhesive provided between the supporting projection and a rear surface of the liquid crystal panel.

A second adhesive may be provided between the diffuser plate and the liquid crystal panel, the diffuser plate being bonded to the liquid crystal panel by the second adhesive, the second adhesive bonding the diffuser plate to the middle mold.

According to another aspect of the disclosure, a display device includes a rear chassis; a light source module provided on the rear chassis, the light source module being configured to emit light; a diffuser plate arranged in front of the light source module, the diffuser plate being configured to diffuse the light emitted from the light source module; a liquid crystal panel arranged in front of the diffuser plate, the liquid crystal panel being configured to display an image; a front chassis covering a side surface of the liquid crystal panel and a side surface of the diffuser plate; a middle mold provided between the front chassis and the rear chassis, the middle mold being coupled to the rear chassis and the diffuser plate; a first adhesive provided between the diffuser plate and the middle mold, the first adhesive bonding the diffuser plate to the middle mold; and a second adhesive bonding the liquid crystal panel to the diffuser plate or bonding the liquid crystal panel to the middle mold.

BRIEF DESCRIPTION OF THE DRAWINGS

The above and other aspects, features, and advantages of certain embodiments the present disclosure will become more apparent from the following description taken in conjunction with the accompanying drawings, in which.

DETAILED DESCRIPTION

Embodiments and features as described and illustrated in the disclosure are merely examples, and there may be various modifications replacing the embodiments and drawings at the time of filing this application.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or chamber discussed below could be termed a second element, component, region, layer or section without departing from the teachings of the disclosure.

Figure 1:
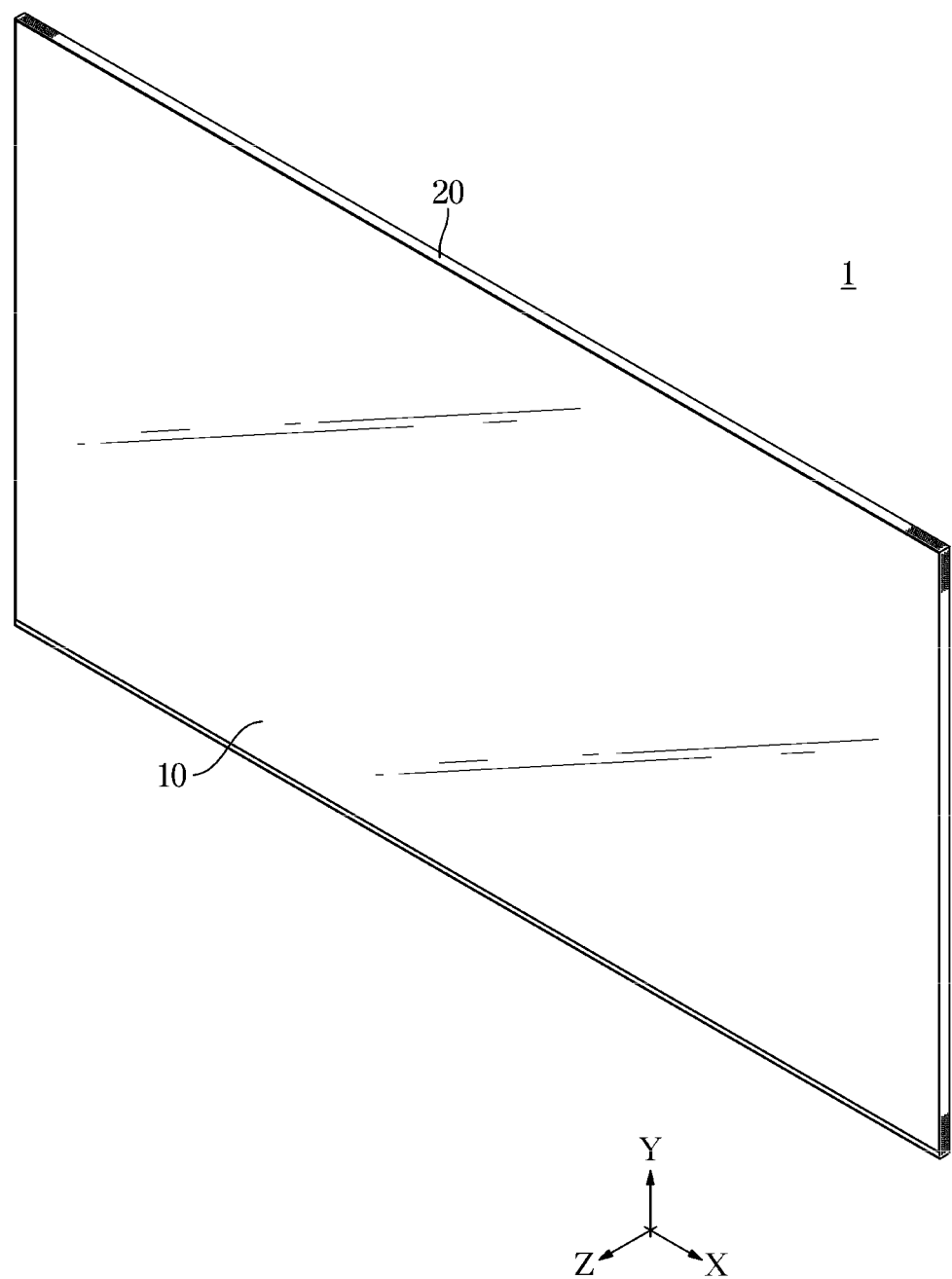
FIG. 1 is a perspective view of a display device, according to an embodiment.

Directions "front", "back (or rear)", "top", "bottom", "left", and "right" will be defined throughout the specification with respect to the directions shown in FIG. 1. In FIG. 1, X-, Y-, and Z-axes perpendicular to one another are shown, where the X-axis represents a left-to-right direction, the Y-axis represents a vertical direction, and the Z-axis represents a front-to-back direction.

Reference will now be made in detail to embodiments of the disclosure, examples of which are illustrated in the accompanying drawings, wherein like reference numerals refer to the like elements throughout. The relative size and depiction of these elements are not necessarily to scale and may be exaggerated for clarity, illustration, and convenience.

Figure 2:
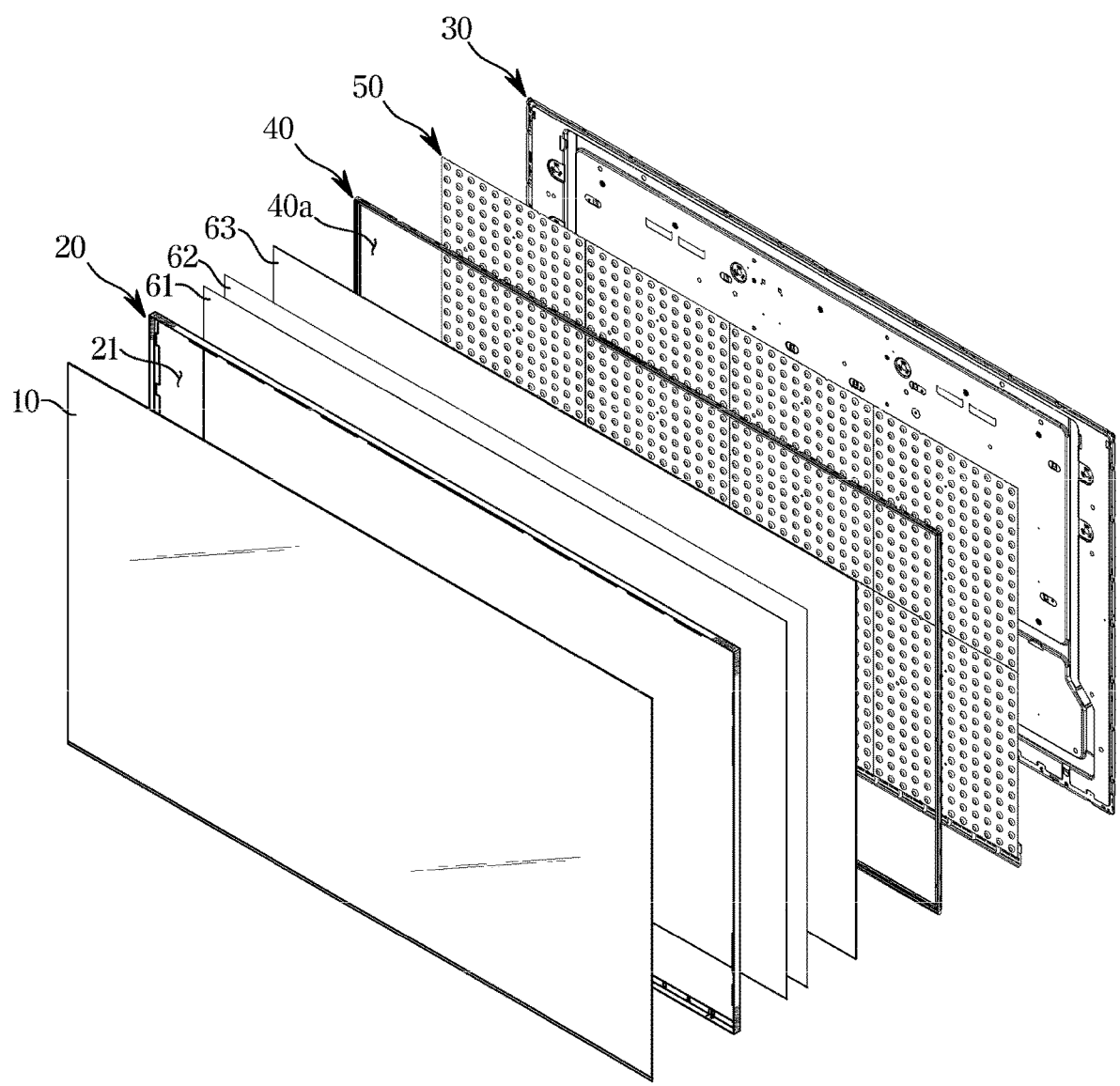
FIG. 2 is an exploded view of major structures of a display device, according to an embodiment.
Figure 3:
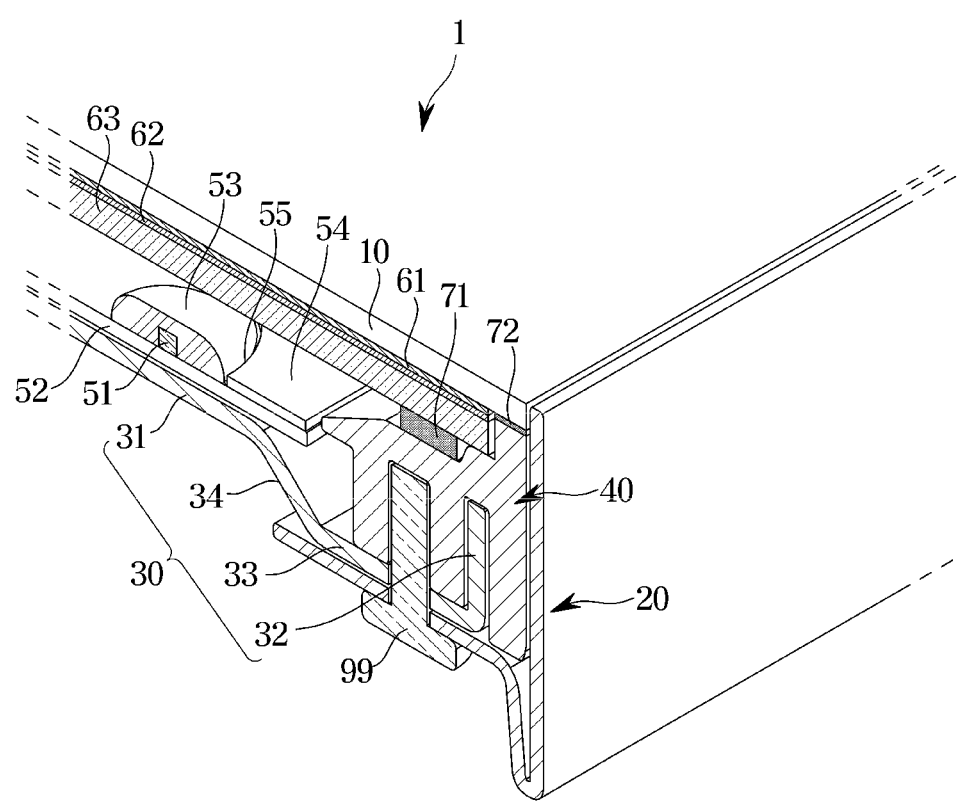
FIG. 3 is a cross-sectional view of a display device, according to an embodiment.
Figure 4:
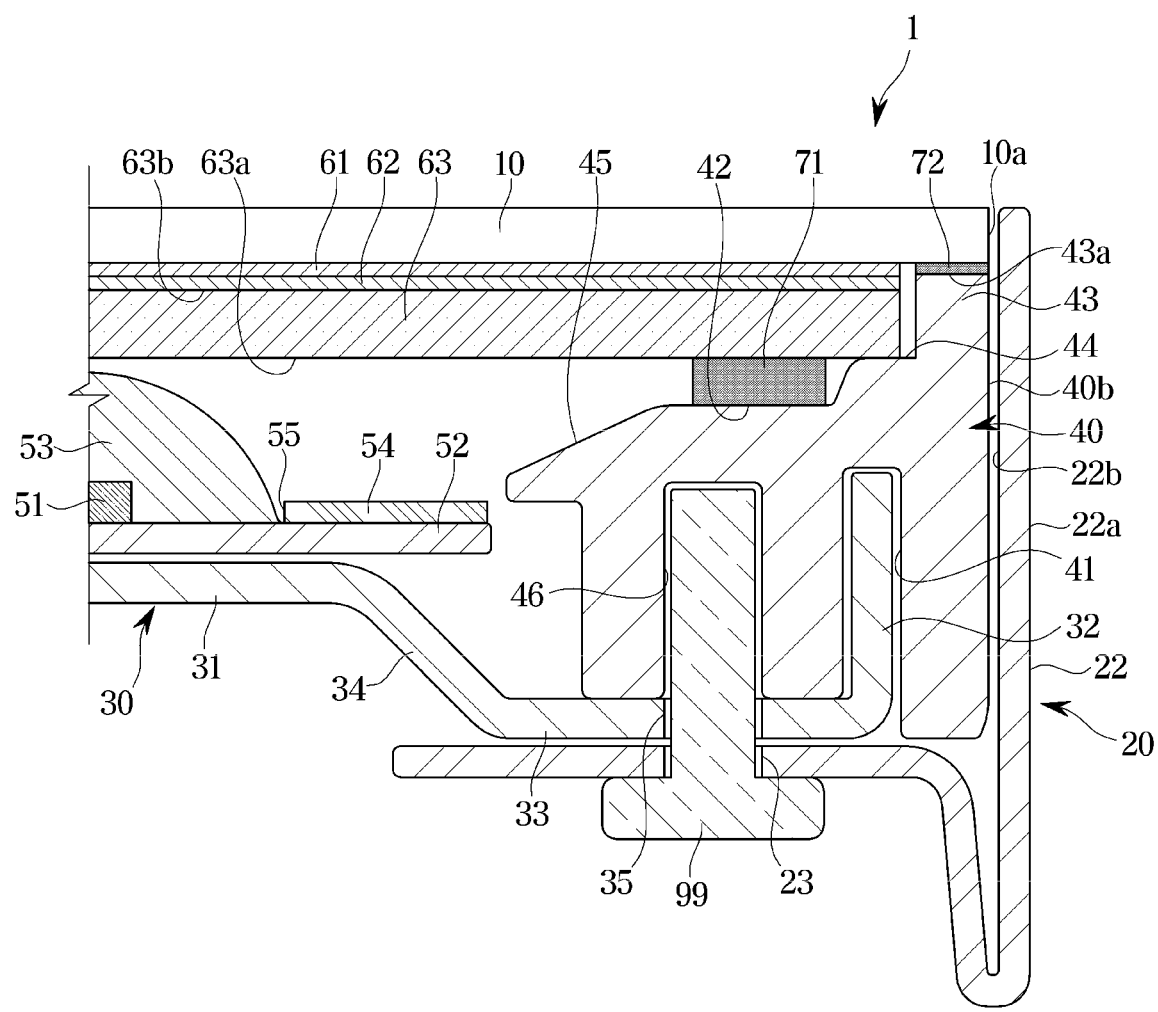
FIG. 4 is a side cross-sectional view of the display device of FIG. 3.

FIG. 1 shows a display device, according to an embodiment. FIG. 2 is an exploded view of a major structure of a display device, according to an embodiment. FIG. 3 is a cross-sectional view of a display device, according to an embodiment. FIG. 4 is a side cross-sectional view of the display device shown in FIG. 3.

Referring to FIGS. 1 to 4, a display device according to an embodiment will now be described.

A display device 1 may include a liquid crystal panel 10 for displaying an image, a backlight unit provided behind the liquid crystal panel 10 to provide light to the liquid crystal panel 10, a rear chassis 30 for supporting the backlight unit, a front chassis 20 for covering edges of the liquid crystal panel 10, and a middle mold 40 coupled between the front chassis 20 and the rear chassis 30.

The display panel 10 may include a thin-film transistor substrate with thin-film transistors provided thereon in the form of a matrix, a color-filter substrate coupled in parallel with the thin-film transistor substrate, and liquid crystal injected between the thin-film transistor substrate and the color-filter substrate and having optical properties that vary by changes in voltage or temperature.

The backlight unit may be provided behind the liquid crystal panel 10 to illuminate the liquid crystal panel 10. The backlight unit may include at least one light source module 50 including at least one light source 51 and at least one substrate 52 on which the at least one light source 51 is mounted, and an optical member provided in a traveling path of the light emitted from the at least one light source 51.

In an embodiment, a plurality of substrates 52 may be provided in the form of plates. The disclosure is not, however, limited thereto, but the substrates 52 may have the form of bars.

The size and/or number of light source modules 50 may depend on the size of the display device 1. In an embodiment, there may be eight light source modules 50, and the eight light source modules 50 may be combined to have a size equal to a size of the liquid crystal panel 10.

A driving power line may be provided on the substrate 52 to supply driving power to the light source 51, and may be connected to a signal cable and a backlight driving circuit.

A plurality of light sources 51 may be mounted on each of the plurality of substrates 52 with gaps therebetween. The light source 51 may include light emitting diodes (LEDs). Alternatively, the light source 51 may include a cold cathode fluorescent lamp (CCFL) or an external electrode fluorescent lamp (EEFL).

A plurality of lenses 53 may be mounted on the substrate 52 to cover the respective light sources 51. The lens 53 may cover the light source 51 to diffuse light emitted from the light source 51.

A reflector sheet 54 may be provided for each of the plurality of substrates 52. The reflector sheet 54 may have the size corresponding to the substrate 52. The reflector sheet 54 may stick to a mounting surface of the substrate 52 on which the light source 51 is mounted. In other words, the reflector sheet 54 may be placed on the front surface of the substrate 52. The reflector sheet 54 may have a through hole 55 formed therein for the light source 51 and the lens 53 to pass through.

The reflector sheet 54 may reflect light to prevent losses of light. Specifically, the reflector sheet 54 may reflect light emitted from the light source 51 or light reflecting backward from a diffuser plate 63 to the rear surface 63a of the diffuser plate 63. The reflector sheet 54 may prevent losses of light emitted from the light source 51 by reflecting the light emitted from the light source 51 that is traveling towards the back of the display device 1.

The backlight unit may include optical members 61, 62, and 63 provided along the traveling path of light emitted from the light source 51.

The optical members 61, 62, and 63 may include a diffuser plate 63 for uniformly diffusing uneven light emitted from the light source 51, and first and second optical sheets 61 and 62 for enhancing properties of light.

The diffuser plate 63 may uniformly diffuse the uneven light generated from the light sources 51. The diffuser plate 63 may uniformly diffuse the light incident on the rear surface 63a to be output to its front surface 63b.

The first and second optical sheets 61 and 62 may be provided in front of the diffuser plate 63 to enhance optical properties of the light output from the diffuser plate 63. Although the first and second optical sheets 61 and 62 are shown in the drawings, the number of optical sheets may be more or less than 2.

The first and second optical sheets 61 and 62 may include a diffuser sheet for offsetting a pattern of the diffuser plate 63, a prism sheet for concentrating the light to enhance brightness, a protection sheet for protecting the other optical sheets against an external shock or inflow of foreign materials, a reflective polarizing sheet (e.g., dual brightness enhancement film (DBEF) for transmitting polarized light while reflecting differently polarized light to enhance brightness, a complex sheet for uniformly diffusing light, a quantum dot sheet for changing wavelengths of light to improve color reproductivity, etc. Quantum dots, which are illuminant semiconductor crystals in a few nanometers, may be distributed inside the quantum dot sheet. The quantum dot may receive blue light to produce any colors of visible light depending on the size of the quantum dot. The smaller the quantum dot is, the shorter wavelength of light may be produced, and the larger the quantum dot is, the longer wavelength of light may be produced.

The first and second optical sheets 61 and 62 and the diffuser plate 63 may be provided in one body. Adhesives may be provided between the first and second optical sheets 61 and 62 and between the second optical sheet 62 and the diffuser plate 63, bonding the first and second optical sheets 61 and 62 and the diffuser plate 63 into one body like a single sheet.

The rear chassis 30 may be provided behind the backlight unit. In an embodiment, the rear chassis 30 may be generally shaped like a plate with the edges bending forward. The backlight unit may be accommodated between the rear chassis 30 and the combination of the liquid crystal panel 10 and front chassis 20.

The rear chassis 30 may include a base 31 on which the light source module 50 is installed, and a bent portion 32 provided on the top, bottom, left and right edges of the rear chassis 30 to be coupled with the middle mold 40.

The base 31 may contact the substrate 52 to radiate heat generated from a heating element such as the light source 51 mounted on the substrate 52. For this, the rear chassis 30 including the base 31 may include various metal substances such as aluminum, steel use stainless (SUS), etc., with high heat transfer efficiency. The rear chassis 30 may include a plastic material such as ABS.

The bent portion 32 may be inserted into an insertion groove 41 provided in the middle mold 40. When the bent portion 32 is inserted to the insertion groove 41, the rear chassis 30 and the middle mold 40 may be coupled to each other.

The rear chassis 30 may further include a middle mold supporter 33 for supporting the middle mold 40, and a link 34 connecting the middle mold supporter 33 to the base 31.

The middle mold supporter 33 may be provided between the bent portion 32 and the base 31 to support the middle mold 40. The link 34 may be provided to connect the middle mold supporter 33 and the base 31. The link 34 may slantingly extend backward from an end of the base 31 to connect to an end of the middle mold supporter 33. The bent portion 32 may be provided at the other end of the middle mold supporter 33.

The light source module 50 may be placed between the base 31 and the diffuser plate 63, and the middle mold 40 may be placed between the middle mold supporter 33 and the diffuser plate 63 and liquid crystal panel 10. A distance between the base 31 and the liquid crystal panel 10 may be shorter than a distance between the middle mold supporter 33 and the liquid crystal panel 10.

The front chassis 20 may be shaped like a frame with an opening 21 for the light from the backlight unit to be provided to the liquid crystal panel 10. The front chassis 20 may cover a side surface of the liquid crystal panel 10 and a side surface of the middle mold 40.

For related art display devices, the front chassis supports the liquid crystal panel by covering the front edges of the liquid crystal panel. Edges around the liquid crystal panel defined by the front chassis are called a bezel, and the bezel causes the size of a screen display area of the liquid crystal panel to be reduced. Furthermore, a thick bezel may negatively affect an aesthetic appearance of the display device.

In this regard, the front chassis 20 may cover the side surface of the liquid crystal panel 10 but may not cover the front of the liquid crystal panel 10. When the front chassis 20 does not cover the screen display area of the liquid crystal panel 10, the size of the screen display area of the liquid crystal panel 10 does not shrink from the front chassis 20. Accordingly, the size of the screen display area of the liquid crystal panel 10 of the display device 1 may be enlarged.

Furthermore, thickness of the front chassis 20 in the left-right direction may be reduced. The thickness of the front chassis 20 in the left-right direction may indicate the size of the bezel. The front chassis 20 is provided to cover the side surface of the liquid crystal panel 10 and the side surface of the middle mold 40, which may be achieved without having a thick front chassis 20. Accordingly, the display device 1 may have a bezel with a reduced size, and thus have an enhanced aesthetic appearance.

Similar to the front chassis 20, the middle mold 40 may be shaped like a frame with an opening 40a for the light from the backlight unit to be provided to the liquid crystal panel 10. The middle mold 40 may be coupled to the rear chassis 30 and the front chassis 20. The middle mold 40 may be affixed to the diffuser plate 63, the first optical sheet 61, and the second optical sheet 62. Furthermore, the middle mold 40 may be affixed to the liquid crystal panel 10.

The middle mold 40 may be placed on the middle mold supporter 33 of the rear chassis 30. The middle mold 40 may include the insertion groove 41 for receiving the bent portion 32 of the rear chassis 30. As described above, as the bent portion 32 may be inserted to the insertion groove 41, and the middle mold 40 and the rear chassis 30 may be coupled to each other.

The middle mold 40 may be affixed to the diffuser plate 63. The middle mold 40 may include a sheet adhesion surface 42. The sheet adhesion surface 42 may be a surface of the middle mold 40 facing the diffuser plate 63 at a distance removed from the diffuser plate 63.

A first adhesive 71 may be provided between the sheet adhesion surface 42 and the diffuser plate 63. The first adhesive 71 may be made with a transparent substance. For example, the first adhesive 71 may include a pressure sensitive adhesive (PSA) having more than 90% of light transmittance. With the first adhesive 71 made with a material having high light transmittance, light emitted from the light source module 50 may pass through the first adhesive 71 and enter into the diffuser plate 63 to minimize loss of light.

The first adhesive 71 may bond the sheet adhesion surface 42 of the middle mold 40 and the rear surface 63a of the diffuser plate 63. The optical members 61, 62, and 63, which may be coupled to each other, may be coupled to the middle mold 40 by the first adhesive 71 without extra structures.

In related art display devices, an extra structure is provided to support the optical sheets. The structure clamps the optical sheets together to prevent them from being separated, but adds thickness to the display device and the bezel.

An alternative design is provided in an embodiment where the optical members 61, 62, and 63 may be coupled to the middle mold 40 by the first adhesive 71 without such an extra structure. Accordingly, the thickness of the display device and the bezel size may be reduced.

In an embodiment, the middle mold 40 may be coupled to the liquid crystal panel 10 to prevent the liquid crystal panel 10 from falling forward out of the display device 1. The middle mold 40 may include a supporting projection 43 protruding toward the liquid crystal panel 10. The supporting projection 43 may include a panel adhesion surface 43a facing the rear surface of the liquid crystal panel 10. A second adhesive 72 may be provided between the panel adhesion surface 43a and the rear surface of the liquid crystal panel 10. The second adhesive 72 may bond the panel adhesion surface 43a of the middle mold 40 and the rear surface of the liquid crystal panel 10. The liquid crystal panel 10 may be fixedly coupled to the middle mold 40 by the second adhesive 72.

As described above, the liquid crystal panel 10 may be fixed to the middle mold 40 by adhesion strength of the second adhesive 72. The liquid crystal panel 10 may be separated from the middle mold 40 when the adhesion strength of the second adhesive 72 becomes weak, so strong adhesion strength of the second adhesive may be required to support the liquid crystal panel 10. To meet this requirement, the second adhesive 72 may include ultraviolet (UV) resin. When the second adhesive 72 is the UV resin, the second adhesive 72 may be applied in a liquid state on the panel adhesion surface 43a and hardened by UV rays, thereby bonding the panel adhesion surface 43a and the rear surface of the liquid crystal panel 10.

The middle mold 40 may also include a sheet supporting surface 44 provided between the supporting projection 43 and the sheet adhesion surface 42. The sheet supporting surface 44 may protrude almost as much as the thickness of the first adhesive 71 from the sheet adhesion surface 42 to the diffuser plate 63. The sheet supporting surface 44 may contact and support the diffuser plate 63. The supporting projection 43 may protrude toward the liquid crystal panel 10 from the sheet supporting surface 44. Alternatively, the sheet supporting surface 44 may not contact the diffuser 63 or may be omitted. When the sheet supporting surface 44 is omitted, the supporting projection 43 may protrude from the sheet adhesion surface 42.

The middle mold 40 may include a light guide plane 45. The light guide plane 45 may guide light generated from the light source 51 towards the diffuser plate 63. Specifically, the light guide plane 45 may guide the light generated from the light source 51 to enter into the first adhesive 71 or to a surface of the diffuser plate 63 that comes into contact with the first adhesive 71. The light guide plane 45 may be inclined to not interfere with the traveling path of the light generated from the light source 51. The light guide plane 45 may prevent the middle mold 40 from interfering with the traveling path of light generated from the light source 51 when the light passes through the lens 53 and enters into the diffuser plate 63. The inclination angle of the light guide plane 45 may be determined by taking into account properties of the light. The inclination angle of the light guide plane 45 may be determined by taking into account a profile of the light.

Otherwise, when the light guide plane 45 is not provided or the sheet adhesion surface 42 extends up to the substrate 52, light generated from the light source 51 and traveling toward the first adhesive 71 may be blocked by the middle mold 40 being in the traveling path. When the light is blocked in the traveling path and fails to reach a portion of the diffuser 63 where the first adhesive 71 is placed, brightness of the liquid crystal panel 10 in the portion where the first adhesive 71 is placed may be degraded or uneven. The light guide plane 45 may provide an unobstructed traveling path to allow the light emitted from the light source 51 to reach a location where the first adhesive 71 is placed.

Accordingly, the display device 1 may minimize degradation or unevenness of brightness of the liquid crystal panel 10.

The middle mold 40 may not protrude sideways from the liquid crystal panel 10. In other words, an outermost surface 40b of the middle mold 40 may be coplanar with a side surface 10a of the liquid crystal panel 10, or may be located farther inside than the side surface 10a of the liquid crystal panel 10. Although the side surface 40b of the middle mold 40 is shown as being coplanar with the side surface 10a of the liquid crystal panel 10, it may be located farther inside than the side surface 10a of the liquid crystal panel 40.

A side wall 22 of the front chassis 20 may be provided to cover a side surface of the liquid crystal panel 10 and a side surface of the middle mold 40. The side wall 22 of the front chassis 20 may include an inner side surface 22b facing the outer surface 40b of the middle mold 40 and an outer side surface 22a opposite to the inner side surface 22b. The inner side surface 22b and the outer side surface 22a may be provided side by side and may extend in a substantially straight line along the front-back direction. A distance between the inner and outer side surfaces 22b and 22a of the front chassis 20 corresponds to the size of the bezel of the display device. The inner and outer side surfaces 22b and 22a of the front chassis 20 may extend in an almost straight line along the front-back direction, so the size of the bezel may be only a thickness of the side wall 22.

In related art displays, the middle mold protrudes outwards from the liquid crystal panel, and the front chassis covers the middle mold by protruding sideways from the liquid crystal panel. When the front chassis extends sideways to cover the middle mold, the size of the bezel defined by the front chassis is larger than the portion of the middle mold protruding outwards from the liquid crystal panel. That is, the related art display have a limitation on reducing the size of the bezel because the middle mold protrudes outwards from the liquid crystal panel.

An alternative design is provided by an embodiment where the middle mold 40 may not include such a portion that protrudes outwards from the liquid crystal panel 10. The front chassis 20 may then be positioned very close to the side surface of the liquid crystal panel 10 because there is no portion protruding outwards from the liquid crystal panel 10. Furthermore, the front chassis 20 may cover the side surface of the liquid crystal panel 10 and the side surface of the middle mold 40, and the front chassis 20 may perform the function of covering the side surface without difficulty even with a thin thickness. Accordingly, the thickness of the side wall 22 of the front chassis 20 may be very thin. As the size of the bezel is proportional to the thickness of the side wall 22 of the front chassis 20, the size of the bezel of the display device 1 may be reduced by minimizing the thickness of the side wall 22 of the front chassis 20. With the reduce size of the bezel, the aesthetics of the display device 1 may be enhanced.

The front chassis 20, the rear chassis 30, and the middle mold 40 may be combined by a fastening member 99 that is provided separately. The middle mold 40 may include a fastening groove 46 into which the fastening member 99 is inserted and coupled. The rear chassis 30 may include a first fastening hole 35 configured to correspond to the fastening groove 46 and for the fastening member 99 to pass through. The front chassis 20 may include a second fastening hole 23 configured to correspond to the fastening groove 46 and the first fastening hole 35 and for the fastening member 99 to pass through.

The fastening member 99 may pass through the first and second fastening holes 35 and 23 and may be fastened into the fastening groove 46. In an embodiment of the disclosure, the fastening member 99 may be screwed into the fastening groove 46. When the fastening member 99 is fastened into the fastening groove 46, the front chassis 20 may be fixedly coupled to the rear chassis 30. Furthermore, when the fastening member 99 is fastened into the fastening groove 46, the rear chassis 30 and the middle mold 40 may be secondarily coupled to each other.

Figure 5:
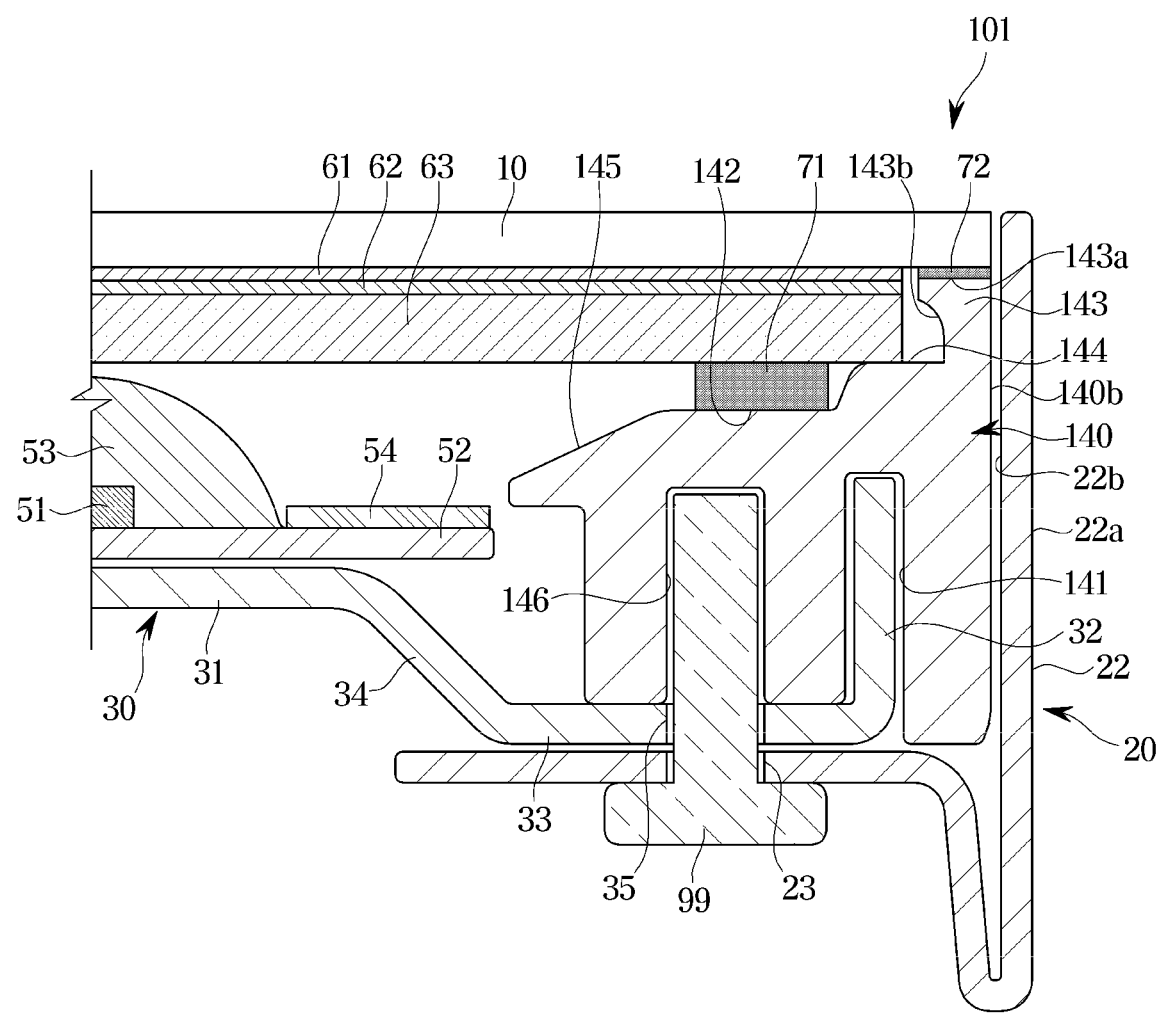
FIG. 5 is a side cross-sectional view of a display device, according to another embodiment.

FIG. 5 is a side cross-sectional view of a display device, according to another embodiment.

The display device 101 may include a liquid crystal panel 10, a backlight unit provided behind the liquid crystal panel 10 to provide light to the liquid crystal panel 10, a rear chassis 30 for supporting the backlight unit, a front chassis 20 for covering edges of the liquid crystal panel 10, and a middle mold 140 coupled between the front chassis 20 and the rear chassis 30.

The structure except for the middle mold 140 is equivalent to that of the embodiment of FIGS. 1, 2, 3, and 4, so the overlapping description will not be repeated.

The middle mold 140 may include a supporting projection 143. The supporting projection 143 may include a panel adhesion surface 143a facing the rear surface of the liquid crystal panel 10. A second adhesive 72 may be provided between the panel adhesion surface 143a and the rear surface of the liquid crystal panel 10.

The supporting projection 143 may further include a light reflecting surface 143b. The light reflecting surface 143b may be provided to reflect the light emitted from the light source 51. The light reflecting surface 143b may be sunken into the supporting projection 143. Specifically, the light reflecting surface 143b may be recessed from a surface of the supporting projection 143 facing the side surface of the diffuser plate 63. The light reflecting surface 143b may be a curved plane to uniformly reflect light. The light reflecting surface 143b may be a smoothly curved plane without angulations. The light reflecting surface 143b may be sunken away from the side surface of the diffuser plate 63.

The light reflecting surface 143b may prevent portions of the edges of the liquid crystal panel 10 from having excessively high brightness. The light reflecting surface 143b may reduce an amount of light emitted through the edges of the liquid crystal panel 10 by reflecting the light backward. This may prevent a relative increase of brightness in the portions of the edges of the liquid crystal panel 10, and accordingly, the liquid crystal panel 10 may have more uniform brightness across its entire area.

Figure 6:
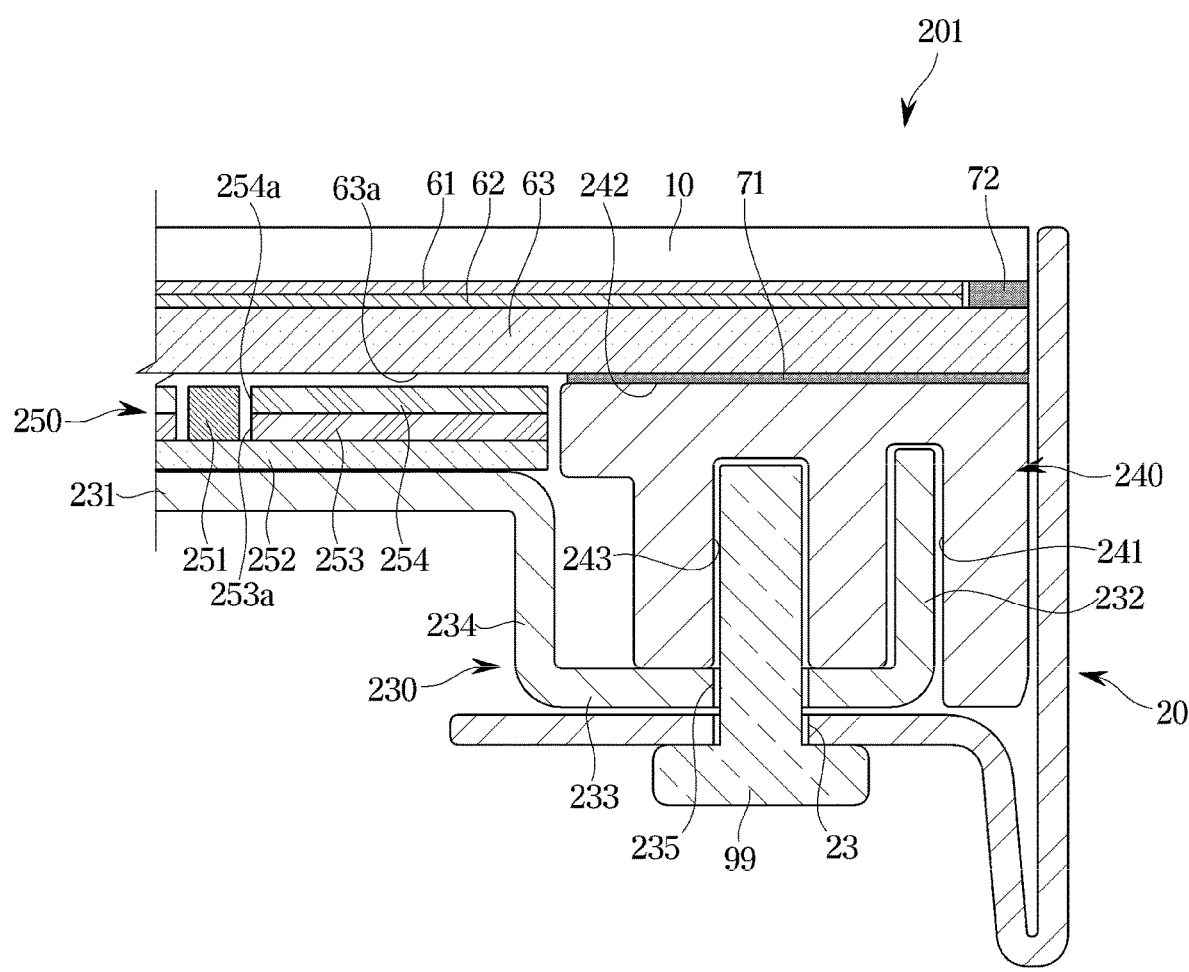
FIG. 6 is a side cross-sectional view of a display device, according to another embodiment.

FIG. 6 is a side cross-sectional view of a display device, according to another embodiment.

The display device 201 may include a liquid crystal panel 10, a backlight unit provided behind the liquid crystal panel 10 to provide light to the liquid crystal panel 10, a rear chassis 230 for supporting the backlight unit, a front chassis 20 for covering edges of the liquid crystal panel 10, and a middle mold 240 coupled between the front chassis 20 and the rear chassis 230.

The backlight unit may be provided behind the liquid crystal panel 10 to illuminate the liquid crystal panel 10. The backlight unit may include a light source module 250 including a light source 251 and a substrate 252 with the light source 251 mounted thereon, and an optical member provided in a traveling path of the light emitted from the light source 251.

The light source module 250 may include a plurality of substrates 252 in the form of plates. It is not, however, limited thereto, the substrates 252 may have other forms such as bars.

The size and/or number of light source modules 250 may depend on the size of the display device. In an embodiment, there may be eight light source modules 250, and the size of the eight light source modules 250 combined may be equal to the size of the liquid crystal panel 10.

A plurality of light sources 251 may be mounted on each of the plurality of substrates 252 with gaps therebetween. The light source 251 may include light emitting diodes (LEDs). A reflector sheet 253 may be placed on the substrate 252. The reflector sheet 253 may reflect light to prevent losses of light. The reflector sheet 253 may include a plurality of through holes 253a for the plurality of light sources 251 to pass through. A light guide film 254 may be placed on the reflector sheet 253. The light guide film 254 may diffuse and guide light generated from the light source 251 to the front. The light guide film 254 may change the light sources 251 from point light sources to a surface light source. Similar to the reflector sheet 253, the light guide film 254 may also include a plurality of through holes 254a.

The light source module 250 may not include a lens. Accordingly, a minimum distance required between the light source and the diffuser plate may be reduced as compared with an embodiment where the lens is provided. Furthermore, a distance between a base 231 of the rear chassis 230 and the liquid crystal panel 10 may be reduced. With the reduced distance between the base 231 and the liquid crystal panel 10, which is thickness of the display device 201 from front to back, may be reduced. With the reduced thickness of the display device 201, the aesthetics of the display device 201 may be enhanced.

A link 234 of the rear chassis may be generally perpendicular to the base 231 and a middle mold supporter 233. A bent portion 232 may be inserted to an insertion groove 241 of the middle mold 240.

The middle mold 240 may include a sheet adhesion surface 242. No projection may be provided on the sheet adhesion surface 242. That is, the sheet adhesion surface 242 may be planar. The first adhesive 71 may be provided between the sheet adhesion surface 242 and the rear surface 63a of the diffuser plate 63. The first adhesive 71 may couple the middle mold 240 to the diffuser plate 63 by bonding the sheet adhesion surface 242 and the rear surface 63a of the diffuser plate 63. The first adhesive 71 may include a PSA or an optical clear adhesive (OCA).

The liquid crystal panel 10 may be fixedly coupled to the diffuser plate 63. The second adhesive 72 may be provided between the liquid crystal panel 10 and the diffuser plate 63 to bond the liquid crystal panel 10 and the diffuser plate 63. Accordingly, the liquid crystal panel 10 may be fixedly coupled to the diffuser plate 63. The second adhesive 72 may include UV resin.

The liquid crystal panel 10 may be coupled to the first optical sheet 61. In this case, the second adhesive 72 may be provided between the liquid crystal panel 10 and the first optical sheet 61.

The liquid crystal panel 10 and the diffuser plate 63 may be coupled by the second adhesive 72 without an extra structure.

In related art displays, an adhesive may be provided on a structure positioned at, e.g., the front chassis, to couple the liquid crystal panel to the front chassis. In such a method, it is difficult to form a liquid crystal panel supporting structure corresponding to the size of a black material (BM) of the ever decreasing liquid crystal panel.

The second adhesive 72 may be provided in a portion corresponding to the BM of the liquid crystal panel. Accordingly, even when the BM of the liquid crystal panel becomes smaller, the liquid crystal panel 10 may be stably coupled to the diffuser plate 63 or the first optical sheet 61.

Figure 7:
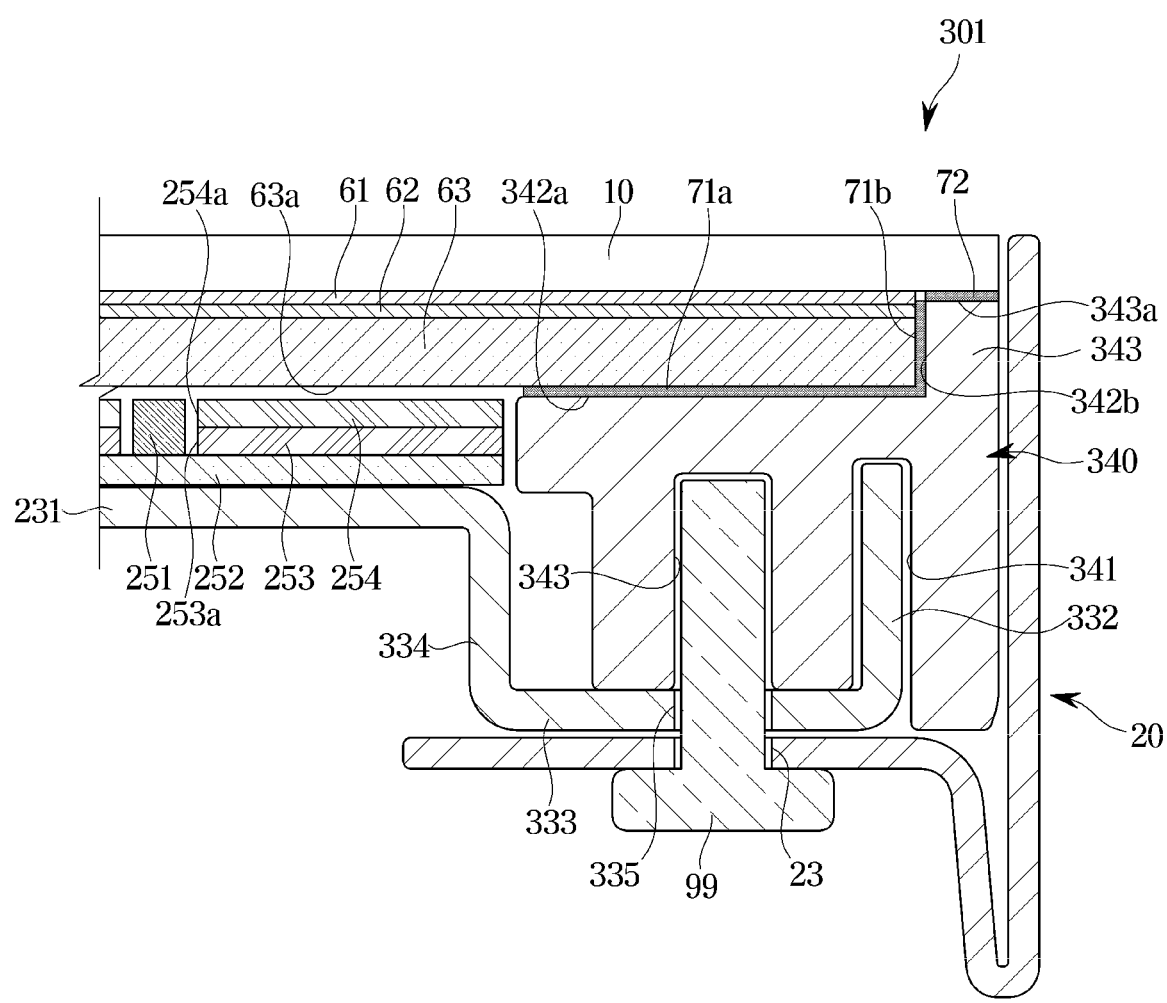
FIG. 7 is a side cross-sectional view of a display device, according to another embodiment.

FIG. 7 is a side cross-sectional view of a display device, according to another embodiment.

The liquid crystal panel 10 of the display device 301 may be fixedly coupled to a middle mold 340.

The middle mold 340 may include a supporting projection 343 protruding toward the liquid crystal panel 10. The supporting projection 343 may include a panel adhesion surface 343a facing the rear surface of the liquid crystal panel 10. The second adhesive 72 may be provided between the panel adhesion surface 343a and the rear surface of the liquid crystal panel 10. The second adhesive 72 may bond the panel adhesion surface 343a of the middle mold 340 and the rear surface of the liquid crystal panel 10. The second adhesive 72 may fixedly couple the liquid crystal panel 10 to the middle mold 340. The second adhesive 72 may include UV resin.

The middle mold 340 may include a first sheet adhesion surface 342a and a second sheet adhesion surface 342b.

The first adhesion surface 342a may face the rear surface 63a of the diffuser plate 63, and a first portion of the first adhesive 71a may be placed between the first sheet adhesion surface 342a and the rear surface 63a of the diffuser plate 63.

The second sheet adhesion surface 342b may face the side surface of the diffuser plate 63. A second portion of the first adhesive 71b may be provided between the second sheet adhesion surface 342b and the side surface of the diffuser plate 63.

The first portion of the first adhesive 71a and the second portion of the first adhesive 71b may include a PSA and an OCA.

The sheet adhesion surfaces 342a and 342b may be double-sided to relatively strengthen adhesion power between the diffuser plate 63 and the middle mold 340. Accordingly, the diffuser plate 63 and the middle mold 340 may be more stably coupled. Since it is attached by the first adhesive member 71a and the second adhesive member 71b, the adhesive strength is enhanced compared to the case where only the first adhesive member 71a is adhered.

Figure 8:
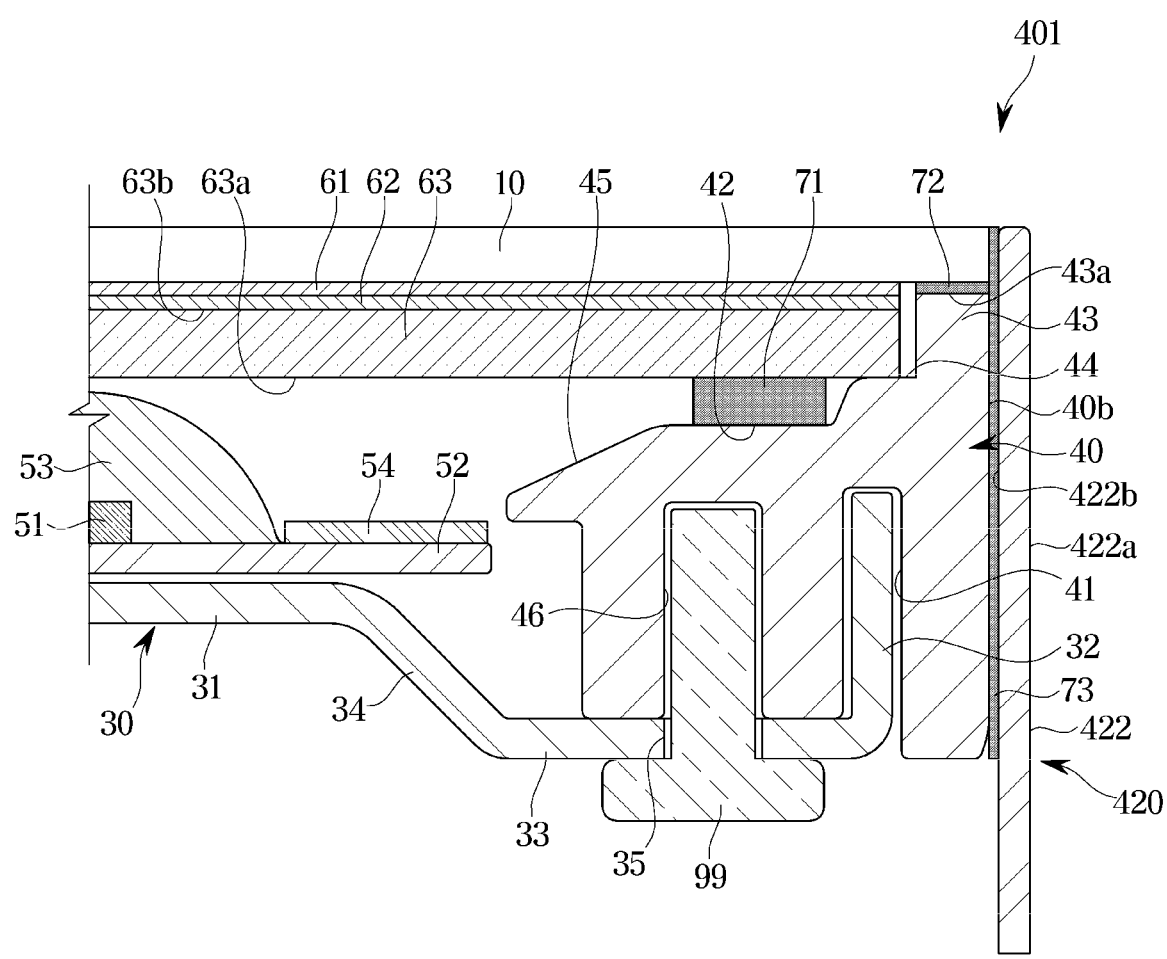
FIG. 8 is a side cross-sectional view of a display device, according to another embodiment.

FIG. 8 is a side cross-sectional view of a display device, according to another embodiment.

The display device 401 may include a liquid crystal panel 10 for displaying an image, a backlight unit provided behind the liquid crystal panel 10 to provide light to the liquid crystal panel 10, a rear chassis 30 for supporting the backlight unit, a front chassis 420 for covering edges of the liquid crystal panel 10, and a middle mold 40 coupled between the front chassis 420 and the rear chassis 30.

All the components but the front chassis 420 are the same as those shown in FIG. 4, so the overlapping description will not be repeated.

The front chassis 420 may cover the side surface of the liquid crystal panel 10 and the middle mold 40.

The front chassis 420 may be fixedly coupled to the side surface of the liquid crystal panel 10. Furthermore, the front chassis 420 may be fixedly coupled to the side surface of the middle mold 40.

A gap may be formed between the front chassis 420 and the liquid crystal panel 10, and similarly, there may be a gap formed between the front chassis 420 and the middle mold 40. A third adhesive 73 may be provided in the gap.

The third adhesive 73 may bond the front chassis 420 to the liquid crystal panel 10. Furthermore, the third adhesive 73 may bond the middle mold 40 to the front chassis 420.

The third adhesive 73 may fixedly couple the front chassis 420 to the middle mold 40, and further to the liquid crystal panel 10. The front chassis 420 may be coupled to the side surface of the liquid crystal panel 10 and the side surface of the middle mold 40 to prevent external foreign materials from being brought into the liquid crystal panel 10 or the middle mold 40.

The front chassis 420 may be coupled to the side surface of the liquid crystal panel 10 and the side surface of the middle mold 40 by the third adhesive 73 without an extra fastening member. Accordingly, the front chassis 420 may not include the extra fastening member, and may thus have slim thickness as compared to a case of having a fastening member.

The front chassis 420 and the middle mold 40 may be coupled by the fastening member 99. The fastening member 99 may pass through the first fastening hole 35 of the rear chassis 30 to be coupled to the fastening groove 46 of the middle mold 40.

Figure 9:
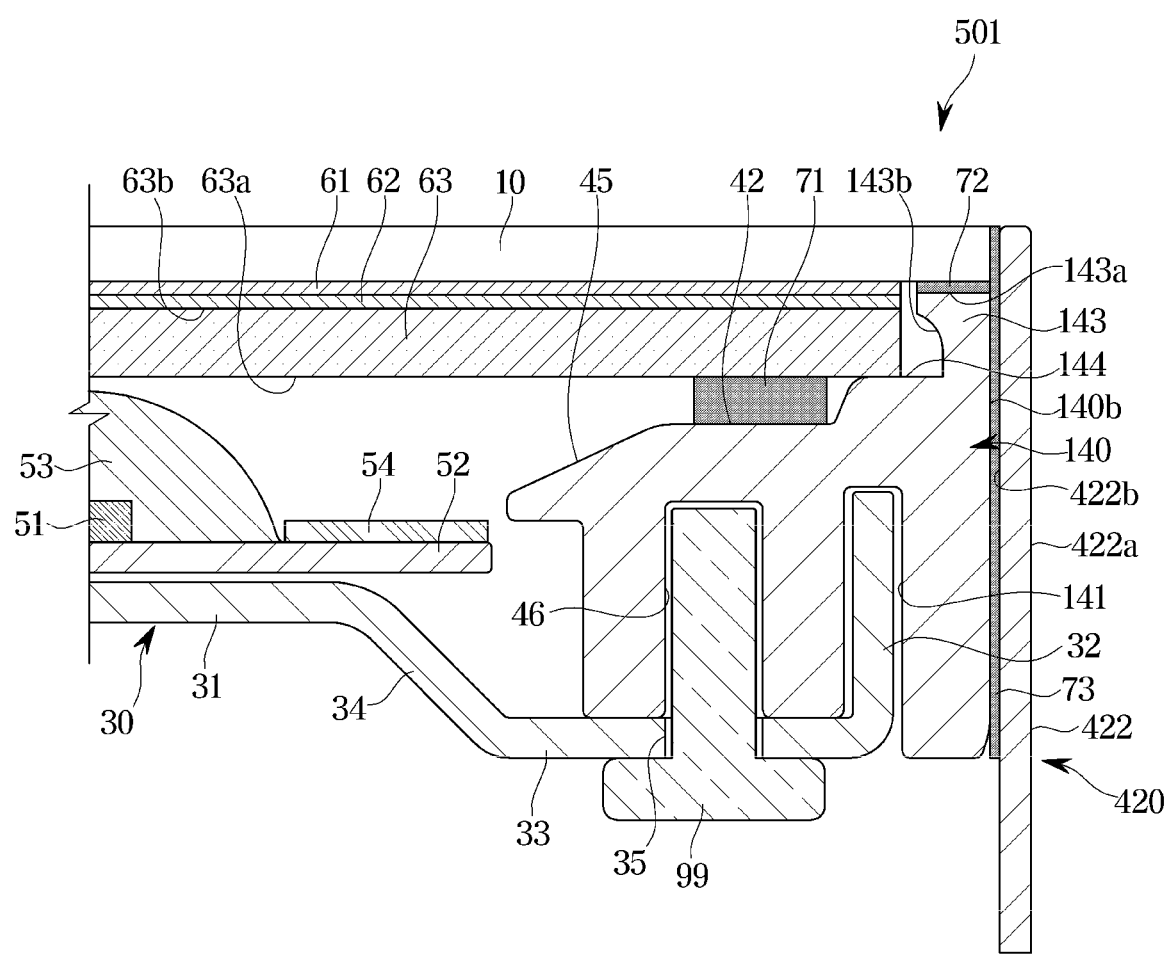
FIG. 9 is a side cross-sectional view of a display device, according to another embodiment.

FIG. 9 is a side cross-sectional view of a display device, according to another embodiment.

The middle mold 140 of the display device 501 may include the supporting projection 143, which may include the light reflecting surface 143b.

The light reflecting surface 143b may prevent portions of the edges of the liquid crystal panel 10 from having excessively high brightness. The light reflecting surface 143b may reduce an amount of light emitted through the edges of the liquid crystal panel 10 by reflecting the light backward. This may prevent a relative increase of brightness in the portions of the edges of the liquid crystal panel 10, and accordingly, the liquid crystal panel 10 may have a more uniform brightness across its entire area.

Furthermore, the front chassis 420 may be coupled to the side surface of the liquid crystal panel 10 and the side surface of the middle mold 140 by the third adhesive 73 without an extra fastening member. Accordingly, the front chassis 420 may not include the extra fastening member, and may thus have slim thickness as compared to a case of having a fastening member.

The front chassis 420 and the middle mold 140 may be coupled by the fastening member 99. The fastening member 99 may pass through the first fastening hole 35 of the rear chassis 30 to be coupled to the fastening groove 141 of the middle mold 240.

Figure 10:
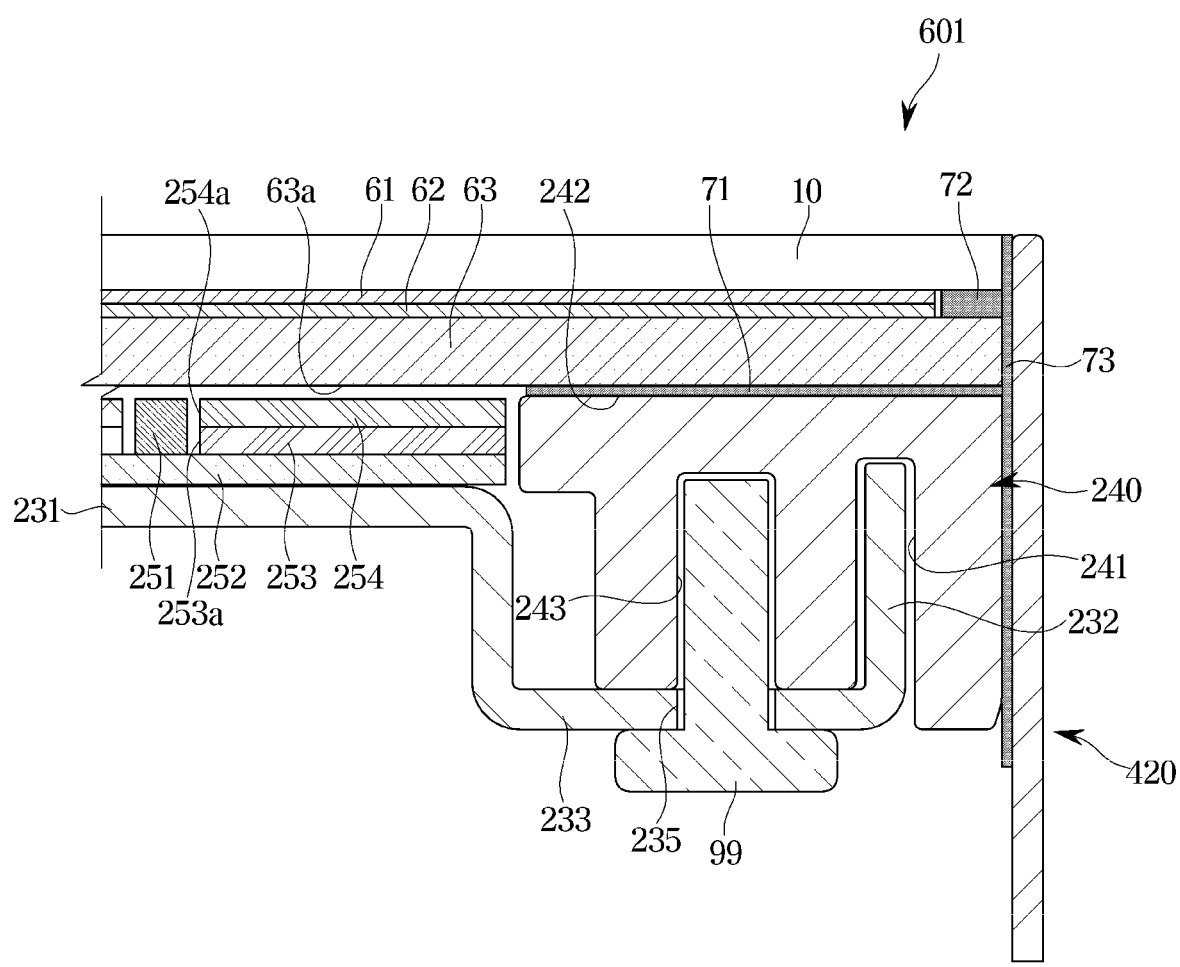
FIG. 10 is a side cross-sectional view of a display device, according to another embodiment.

FIG. 10 is a side cross-sectional view of a display device, according to another embodiment.

The light source module 250 of the display device 601 may not include a lens. Accordingly, a minimum distance required between the light source and the diffuser plate may be reduced as compared with an embodiment where the lens is provided. Furthermore, a distance between a base 231 of the rear chassis 230 and the liquid crystal panel 10 may be reduced. With the reduced distance between the base 231 and the liquid crystal panel 10, thickness of the display device 601 from front to back may be reduced. With the reduced thickness of the display device 601, the aesthetics of the display device 601 may be enhanced.

The middle mold 240 may include the sheet adhesion surface 242. No projection may be provided on the sheet adhesion surface 242. The first adhesive 71 may be provided between the sheet adhesion surface 242 and the rear surface 63a of the diffuser plate 63. The first adhesive 71 may couple the middle mold 240 to the diffuser plate 63 by bonding the sheet adhesion surface 242 and the rear surface 63a of the diffuser plate 63. The first adhesive 71 may include a PSA or an OCA.

The liquid crystal panel 10 may be fixedly coupled to the diffuser plate 63. The second adhesive 72 may be provided between the liquid crystal panel 10 and the diffuser plate 63 to bond the liquid crystal panel 10 to the diffuser plate 63. Accordingly, the liquid crystal panel 10 may be fixedly coupled to the diffuser plate 63. The second adhesive 72 may include UV resin.

In an embodiment, the liquid crystal panel 10 may be coupled to the first optical sheet 61. In this case, the second adhesive 72 may be provided between the liquid crystal panel 10 and the first optical sheet 61.

The liquid crystal panel 10 and the diffuser plate 63 may be coupled by the second adhesive 72 without an extra structure.

The front chassis 420 may be coupled to the side surface of the liquid crystal panel 10 by the third adhesive 73. Furthermore, the front chassis 420 may be coupled to the side surface of the diffuser plate 63 by the third adhesive 73. Furthermore, the front chassis 420 may be coupled to the middle mold 240 by the third adhesive 73. Accordingly, the front chassis 420 may be coupled to the liquid crystal panel 10, the diffuser plate 63, and the middle mold 240 without an extra fastening member. The front chassis 420 may not include the extra fastening member, and may thus have slim thickness as compared to a case of having a fastening member.

The front chassis 420 and the middle mold 240 may be coupled by the fastening member 99. The fastening member 99 may pass through the first fastening hole 235 of the rear chassis 230 to be coupled to the fastening groove 243 of the middle mold 240.

Figure 11:
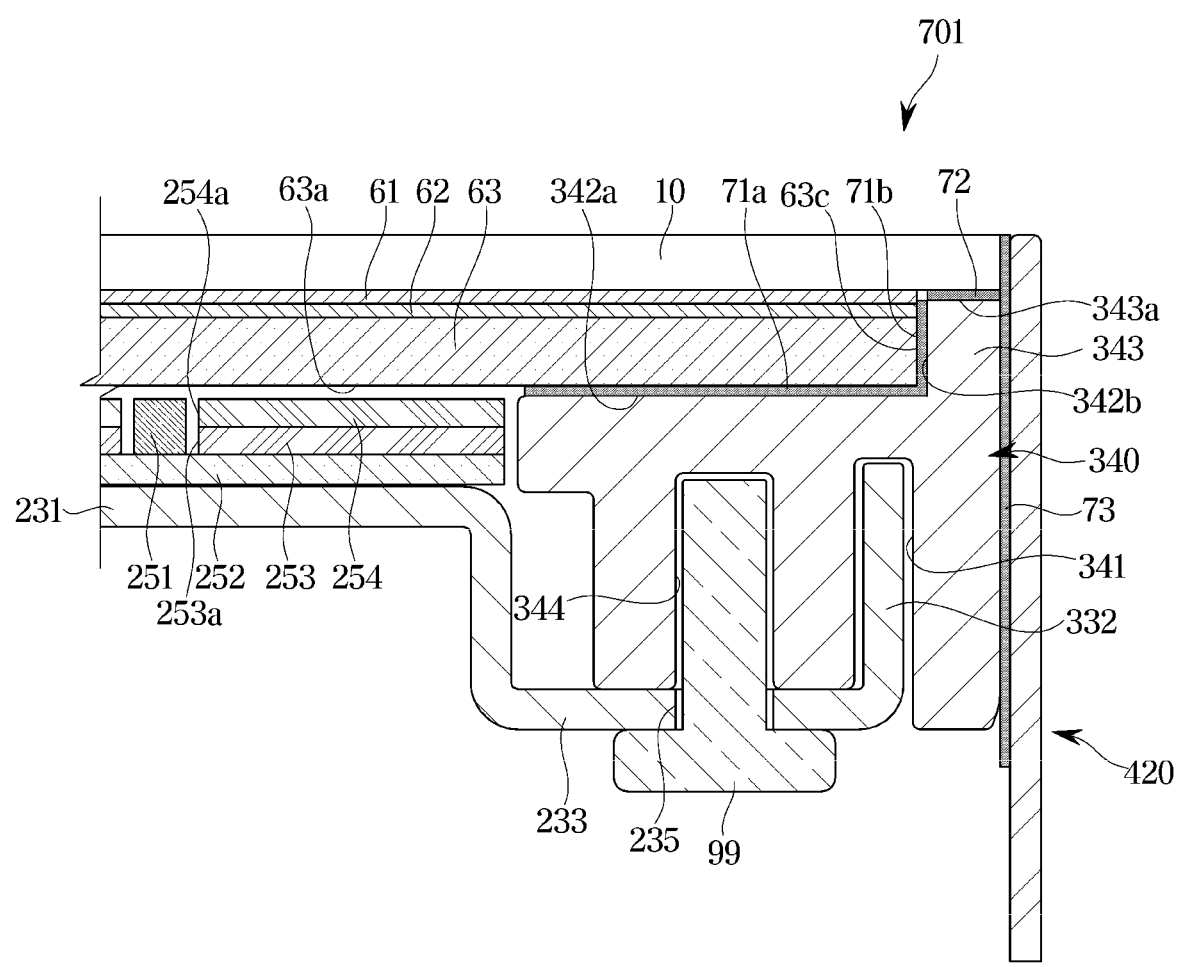
FIG. 11 is a side cross-sectional view of a display device, according to another embodiment.

FIG. 11 is a side cross-sectional view of a display device, according to another embodiment.

The liquid crystal panel 10 of the display device 701 may be fixedly coupled to a middle mold 340.

The middle mold 340 may include the supporting projection 343 protruding toward the liquid crystal panel 10. The supporting projection 343 may include a panel adhesion surface 343a facing the rear surface of the liquid crystal panel 10. The second adhesive 72 may be provided between the panel adhesion surface 343a and the rear surface of the liquid crystal panel 10. The second adhesive 72 may be provided to bond the panel adhesion surface 343a of the middle mold 340 and the rear surface of the liquid crystal panel 10. With the second adhesive 72, the liquid crystal panel 10 may be fixedly coupled to the middle mold 340. The second adhesive 72 may include UV resin.

The middle mold 340 may include the first sheet adhesion surface 342a and the second sheet adhesion surface 342b.

The first sheet adhesion surface 342a may be oriented to face the rear surface 63a of the diffuser plate 63, and the first portion of the first adhesive 71a may be placed between the first sheet adhesion surface 342a and the rear surface 63a of the diffuser plate 63.

The second sheet adhesion surface 342b may be oriented to face side surface 63c of the diffuser plate 63. The second portion of the first adhesive 71b may be provided between the second sheet adhesion surface 342 and the side surface 63c of the diffuser plate 63.

The first portion of the first adhesive 71a and the second portion of the first adhesive 71b may include an PSA and an OCA.

The sheet adhesion surfaces 342a and 342b may be double-sided to relatively strengthen adhesion power between the diffuser plate 63 and the middle mold 340. Accordingly, the diffuser plate 63 and the middle mold 340 may be more stably coupled.

The front chassis 420 may be coupled to the side surface of the liquid crystal panel 10 by the third adhesive 73. Furthermore, the front chassis 420 may be coupled to the middle mold 340 by the third adhesive 73. The front chassis 420 may be coupled to the liquid crystal panel 63 and the middle mold 340 without an extra fastening member. The front chassis 420 may not include the extra fastening member, and may thus have slim thickness as compared to a case of having a fastening member.

The front chassis 240 and the middle mold 340 may be coupled by the fastening member 99. The fastening member 99 may pass through the first fastening hole 235 of the rear chassis 230 to be coupled to the fastening groove 344 of the middle mold 340.

According to one or more embodiments, a size of a bezel on a display device may be reduced to enhance aesthetics of the display device.

According to one or more embodiments, a thickness from a front to a back of a display device may be reduced to enhance aesthetics of the display device.

Certain embodiments of the disclosure have been described above, but a person of ordinary skill in the art will understand and appreciate that various modifications can be made without departing the scope of the disclosure. Thus, it will be apparent to those ordinary skilled in the art that the true scope of technical protection is only defined by the following claims.

What is claimed is:

1. A display device comprising:
a rear chassis;
a light source module installed on the rear chassis, the light source module being configured to emit light;
a diffuser plate provided in front of the light source module, the diffuser plate being configured to diffuse the light emitted by the light source module;
a liquid crystal panel provided in front of the diffuser plate, the liquid crystal panel being configured to display an image;
a front chassis covering a side surface of the liquid crystal panel and a side surface of the diffuser plate;
a middle mold provided between the front chassis and the rear chassis and coupled to the rear chassis and the diffuser plate, wherein the middle mold comprises a first adhesion surface, a sheet supporting surface protruding toward the liquid crystal panel by a first thickness, and a supporting projection protruding toward the liquid crystal panel by a second thickness that is larger than the first thickness and having a second adhesion surface;
a first adhesive provided on the first adhesion surface and provided between the diffuser plate and the middle mold, the first adhesive bonding the diffuser plate to the middle mold;
a second adhesive provided on the second adhesion surface and provided between the middle mold and the liquid crystal panel, the second adhesive bonding the middle mold to the liquid crystal panel; and
a fastening member,
wherein the sheet supporting surface of the middle mold contacts and supports the diffuser plate,
wherein the middle mold further comprises an inserting groove into which a bent portion of the rear chassis is inserted and a fastening groove, and
wherein the fastening member passes through a fastening hole of the rear chassis and is inserted into the fastening groove.

2. The display device of claim 1, wherein an outermost surface of the middle mold is coplanar with the side surface of the liquid crystal panel, or is located within a perimeter defined by the side surface of the liquid crystal panel.

3. The display device of claim 1, wherein the front chassis comprises:
an inner side surface facing the side surface of the liquid crystal panel, the side surface of the diffuser plate, and a side surface of the middle mold, and
an outer side surface opposite to the inner side surface, and
wherein the inner side surface extends parallel to the outer side surface.

4. The display device of claim 1, wherein the second adhesive comprises ultraviolet (UV) resin configured to be applied in a liquid state and hardened by a UV ray.

5. The display device of claim 1, wherein the side surface of the diffuser plate is located within a perimeter defined by the side surface of the liquid crystal panel, and
wherein the supporting projection is provided next to the side surface of the diffuser plate and the supporting projection is bonded directly to the liquid crystal panel by the second adhesive.

6. A display device comprising:
a rear chassis;
a light source module installed on the rear chassis, the light source module being configured to emit light;
a diffuser plate provided in front of the light source module, the diffuser plate being configured to diffuse the light emitted by the light source module;
a liquid crystal panel provided in front of the diffuser plate, the liquid crystal panel being configured to display an image;
a front chassis covering a side surface of the liquid crystal panel and a side surface of the diffuser plate;
a middle mold provided between the front chassis and the rear chassis and coupled to the rear chassis and the diffuser plate and including a first adhesion surface and a supporting projection protruding toward the liquid crystal panel and having a second adhesion surface;
a first adhesive provided on the first adhesion surface and provided between the diffuser plate and the middle mold, the first adhesive bonding the diffuser plate to the middle mold; and
a second adhesive provided on the second adhesion surface and provided between the middle mold and the liquid crystal panel, the second adhesive bonding the middle mold to the liquid crystal panel,
wherein the supporting projection comprises a light reflecting surface within a recess provided in a side of the supporting projection facing the side surface of the diffuser plate, and
wherein the light reflecting surface is configured to reflect the light emitted from the light source module towards a back of the display device.

7. The display device of claim 1, wherein the first adhesive comprises a transparent substance with 90% or more of light transmittance so that light is transmitted between the diffuser plate and the middle mold through the first adhesive.

8. The display device of claim 7, wherein the middle mold further comprises a light guide surface providing a path for light emitted from the light source module to pass through the first adhesive and enter into the diffuser plate, and wherein the light guide surface is inclined backwards from an adhesion surface of the middle mold on which the first adhesive is disposed.

9. The display device of claim 1, further comprising a third adhesive bonding the side surface of the diffuser plate to the middle mold, wherein a rear surface of the diffuser plate is bonded to the first adhesion surface by the first adhesive.

10. The display device of claim 1, wherein the liquid crystal panel is bonded to the diffuser plate by the second adhesive, and wherein the diffuser plate is bonded to the middle mold by the first adhesive.

11. The display device of claim 1, wherein the light source module comprises:

a plurality of light sources configured to emit light toward the diffuser plate, a substrate on which the plurality of light sources are mounted to face the diffuser plate, and a reflecting sheet provided on the substrate, the reflecting sheet being configured to reflect light emitted from the plurality of light sources and light reflected from the diffuser plate back toward the diffuser plate.

12. The display device of claim 11, wherein the light source module further comprises a plurality of lenses mounted on the substrate and covering the plurality of light sources, the plurality of lenses being configured to diffuse light emitted from the plurality of light sources.

13. The display device of claim 1, further comprising a chassis adhesive bonding the front chassis to a side surface of the middle mold.

14. A display device comprising:

a rear chassis;

a light source module provided on the rear chassis, the light source module being configured to emit light;

a liquid crystal panel provided in front of the light source module, the liquid crystal panel comprising a front surface configured to display an image;

a front chassis covering a side surface of the liquid crystal panel;

a middle mold coupled to the rear chassis to support the liquid crystal panel, the middle mold having an outermost surface positioned coplanar with the side surface of the liquid crystal panel or positioned within a perimeter defined by the side surface of the liquid crystal panel, wherein the middle mold comprises a first adhesion surface, a sheet supporting surface protruding toward the liquid crystal panel by a first thickness, and a supporting projection protruding toward the liquid crystal panel by a second thickness that is larger than the first thickness and having a second adhesion surface;

a diffuser plate provided in front of the light source module, the diffuser plate being configured to diffuse the light emitted from the light source module;

a first adhesive provided on the first adhesion surface and provided between the diffuser plate and the middle mold, the first adhesive bonding the diffuser plate to the middle mold;

a second adhesive provided on the second adhesion surface and provided between the middle mold and the liquid crystal panel, the second adhesive bonding the middle mold to the liquid crystal panel; and a fastening member, wherein the sheet supporting surface of the middle mold contacts and supports the diffuser plate, wherein the middle mold further comprises an inserting groove into which a bent portion of the rear chassis is inserted and a fastening groove, and wherein the fastening member passes through a fastening hole of the rear chassis and is inserted into the fastening groove.

\* \* \* \* \*